United States Patent

[11] 3,537,404

| [72] | Inventors | James T. Rohrbacher<br>Chicago, and<br>Richard C. Wagner, Clarendon Hills,<br>Illinois |
|---|---|---|
| [21] | Appl. No. | 755,592 |
| [22] | Filed | Aug. 27, 1968 |
| [45] | Patented | Nov. 3, 1970 |
| [73] | Assignee | Integral Process Systems, Inc.<br>a corporation of Illinois |

[54] PASTRY FORMING APPARATUS AND METHOD
17 Claims, 4 Drawing Figs.

[52] U.S. Cl. .................................................. 107/1,
  107/4, 107/54, 107/57
[51] Int. Cl. ............................................... A21b 1/46
[50] Field of Search ............................................. 107/1(all),
  4(all), 54, 57

[56] References Cited
UNITED STATES PATENTS
2,718,972  9/1955  Temple ...................... 107/4
2,899,914  8/1959  Arsdell ........................ 107/4

Primary Examiner—William I. Price
Assistant Examiner—Robert I. Smith
Attorney—Dressler, Goldsmith, Clement and Gordon ABSTRACT: An apparatus and method for automatically and continuously providing individual filled pastries including, a liquid reservoir at a dispensing station, means for maintaining a preselected level of liquid within said reservoir, a rotary drum having a portion disposed below the liquid level in said reservoir for picking up liquid by surface adhesion, said drum having a portion disposed above the level of liquid in said reservoir, stripping means for removing liquid from the exposed portion of said drum and for depositing the liquid as a web on a continuously movable conveyor, heating means in line with said conveyor for cooking the web of liquid on the conveyor, a discharge conveyor for receiving the cooked web, means for severing the web longitudinally and transversely to form individual leaves, and means for dispensing filling material on each leaf.

Patented Nov. 3, 1970 3,537,404
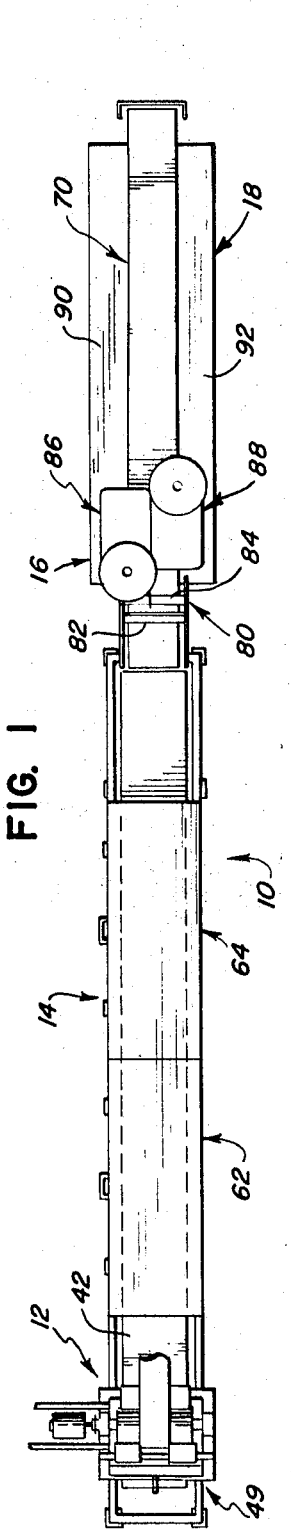
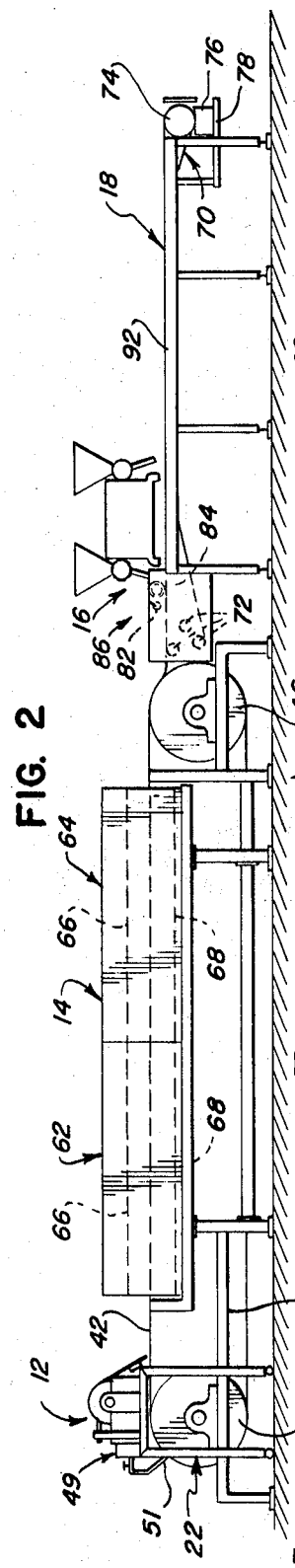
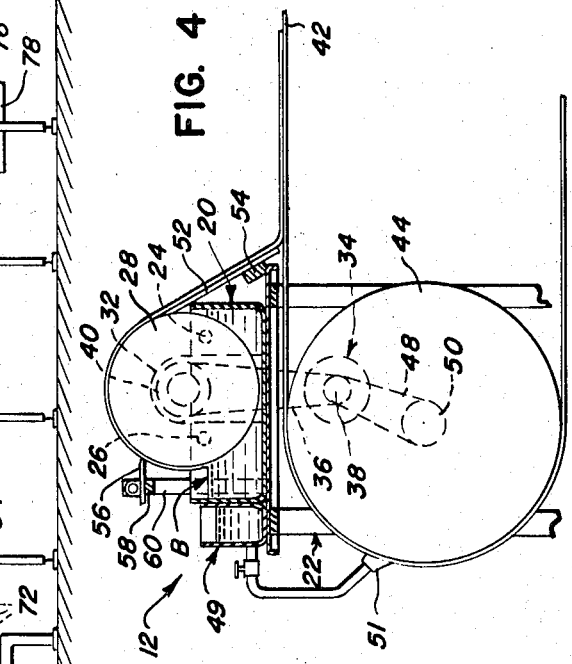
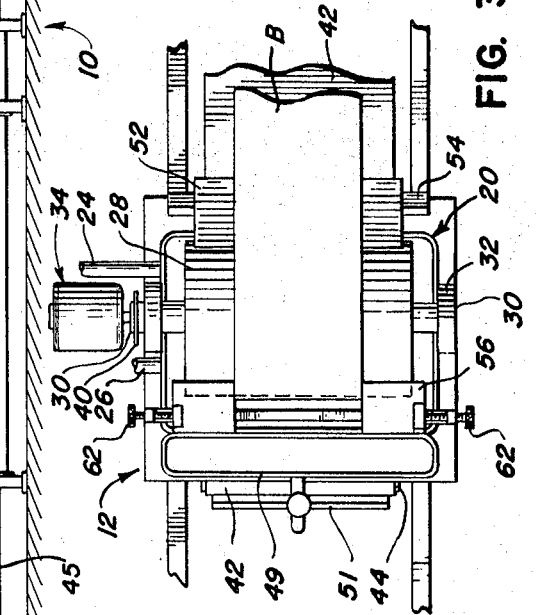
INVENTORS
JAMES T. ROHRBACHER
RICHARD C. WAGNER
BY
Dressler, Goldsmith, Clement & Gordon
ATTORNEYS 3,537,404

1

PASTRY FORMING APPARATUS AND METHOD

BACKGROUND OF THE INVENTION

The present application relates to a method and apparatus for preparing foodstuffs, such as blintzes, crepe suzettes or the like. More particularly, the present invention relates to a method and apparatus for automatically and continuously processing batter to produce individual filled pastries at a high rate of speed with a minimum use of manpower.

In the past, many different techniques have been proposed for producing individual filled pastries, however, known techniques have been essentially of the "batch" variety, wherein a limited number of pastries are formed at one time. One of the major obstacles that has prevented the automating of the pastry forming technique has been the difficulty in initially handling the batter to provide a layer of liquid of uniform width and thickness so that individual pastry leaves of appropriate size could be continuously produced.

SUMMARY OF THE INVENTION

The present invention obviates the problems noted above by providing a continuously operable batter processor including a novel means for providing a layer of batter of predetermined width and thickness. To this end, a reservoir of batter is provided at a liquid dispensing station, and a predetermined level of batter is retained in the reservoir by overflow means at a desired level in said reservoir for returning excess batter to a batter source. A rotary drum is provided at the dispensing station, with a portion of the drum being immersed in the batter in the reservoir, and with a portion of the drum being disposed above the upper surface of the batter. The drum is rotated at a speed sufficient to cause the drum to pick up the batter by surface adhesion. An inclined blade is positioned in liquid stripping relationship with respect to the exposed portion of the drum, so that as the drum rotates, the liquid carried by the drum will be stripped therefrom in web form. A pair of adjustable, laterally spaced stripping blades are also positioned in material stripping relationship with respect to the drum for controlling the width of the web of batter. A continuously moving conveyor is positioned below the inclined stripping blade, and the conveyor receives the web of material from the drum and transports it through heating means in the form of an oven for cooking the batter.

As the cooked web of batter emerges from the heating means, it is transferred to a further conveyor at a cutting and filling station. The web of batter is cut both longitudinally and transversely to provide individual leaves, and a preselected quantity of filling material is dispensed onto each leaf. The cut and filled leaves are then rolled and boxed manually on side tables adjacent the further conveyor.

BRIEF DESCRIPTION OF THE DRAWINGS

FIG. 1 is a top plan view of the apparatus of the present invention;
FIG. 2 is a side elevational view of the apparatus illustrated in FIG. 1;
FIG. 3 is an enlarged top plan view of the batter handling structure at the dispensing station; and
FIG. 4 is a central sectional view through the structure illustrated in FIG. 3.

DETAILED DESCRIPTION OF THE PREFERRED EMBODIMENT

While the invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawing in detail, the apparatus of the present invention is indicated in its entirety at 10, and the apparatus includes means defining a batter dispensing station 12, a batter cooking station 14, a cutting and filling station 16 and a product removal station 18.

The structure at the dispensing station 12 will be best seen from FIGS. 3 and 4, and as illustrated therein, a reservoir 20, in the form of an upwardly open generally rectangularly shaped pan, is provided at the dispensing station and is adapted to contain a preselected quantity of batter B therein. The reservoir 20 is carried upon a cartlike support 22, that may be moved into and out of position adjacent the batter cooking station 14. Batter is pumped into reservoir 20 through a line 24 that extends to a suitable source of batter (not shown), and the batter is maintained at a preselected level within reservoir 20 by an overflow pipe 26 that returns excess batter to the batter source.

A cylindrically shaped drum 28 has stub shafts 30 at opposite ends thereof rotatably mounted in brackets 32 that extend upwardly from support 22. The drum 28 is positioned with its lower surface immersed within the batter B in reservoir 20, with the upper portion of drum 28 being exposed above the reservoir 20. A motor 34 is mounted upon the support 22, and a belt 36 is trained over a pulley 38 fixed to the motor shaft and over a pulley 40 fixed to one stub shaft 30 of the drum 28 for rotation of the drum. Motor 34 is of the variable speed variety, so that the rotational speed of drum 28 can be varied, as desired. As the drum 28 is rotated in a clockwise direction, as viewed in FIG. 4, by the motor 34, the batter within the reservoir 20 will adhere to the drum 28, and a thin layer of batter will be lifted out of the reservoir 20 and transported toward the heating means 14.

An endless conveyor 42 is positioned beneath the rotary drum 28, and conveyor 42 is trained over a first drum 44 carried by a support frame 45 and over a second drum 46 that is rotatably mounted adjacent the exit end of the heating means 14. The rotation of drum 44 may be synchronized with the rotation of drum 28 by having a belt 48 engage the motor output pulley 38 and a pulley 50 on the drum 44, but a separate drive system (not shown) may be provided for the drum 44, if it is desired to control the speed of conveyor 42 independently of drum 28.

An oil reservoir 49 is provided on support 22 around batter reservoir 20 for lubricating conveyor 42 prior to the deposit of batter thereon. Oil dispensing means, in the form of a brush assembly 51, is provided for applying a coating of oil to the drum, so that the cooked batter will not stick to the drum. Surprisingly enough, it has been found that a thin layer of oil will prevent the relatively sticky batter from adhering to the conveyor 42, so that the cooked web of batter may be easily and conveniently removed from the conveyor.

Means is provided for stripping the web of batter from the drum 28 and for transferring the web to the conveyor 42, and to this end, an upwardly extending, rearwardly inclined stripper blade 52 is fixed to a transversely extending support member 54 associated with frame 22, with the upper edge of stripper blade 52 being disposed closely adjacent to the periphery of drum 28 for removing the web of material from the drum as it rotates. The lower edge of stripper blade 52 is positioned immediately above conveyor 42, so that as drum 28 is rotated in a clockwise direction, as viewed in FIG. 4, the layer of batter stripped from the drum by the upper edge of the blade 52 will travel down the inclined blade 52 and onto the conveyor 42.

From the foregoing, it will be appreciated that, other things being equal, the thickness of the layer of batter B that is transferred from the drum 28 to the conveyor 42 depends upon the rotational speed of drum 28. The thickness of the batter can be controlled by varying the speed of motor 34. The present invention also includes means for varying the width of the web of batter B, and to this end, a pair of laterally spaced blades 56 are positioned in material stripping relationship with respect to drum 28 on a side thereof opposite from blade 52. Stripper blades 56 are mounted upon laterally inwardly extending support plates 58 that are secured to upright brackets 60 fixed to support frame 22. The stripper blades 56 may be adjusted by means of set screws 62 that are threadably received in appropriate openings in brackets 60, and which bear upon the outer end of the stripper blades 56.

All of the major components of the above described dispenser, including the reservoir 20, drum 28, and stripper blades 52 and 56, are formed of stainless steel so that the dispenser may easily be kept in a sanitary condition. The support frame 22 is preferably mounted upon casters, so that the dispenser assembly can be readily moved from the remaining structure to be cleaned, when desired.

The means at the heating station 14 for cooking the web of batter includes a pair of insulated box sections 62 and 64, each of which includes an upper infrared heater on the top side of the conveyor 42 and a lower infrared heater 68 on the bottom side of the conveyor 42. Each box section preferably includes hinged side doors providing manual access to the interior of the ovens. The infrared heaters 66 and 68 are controlled in a known manner by percentage timers (not shown) which have an upper limit temperature cutoff for safety purposes. The conveyor 42 is preferably formed of a heat resistant material, such as a tempered carbon steel, so as not to be adversely affected by the elevated temperatures existing in the box sections 62 and 64.

A discharge conveyor 70 is positioned in line with the conveyor 42 for receiving the cooked ribbon emerging from oven 64. Conveyor 70 is trained around guide rollers 72 and 74, and is driven by a motor unit 76 carried by a support 78. A cutter assembly 80 is provided at the entrance end of conveyor 70, and the cutter assembly, by itself, forms no part of the present invention. The cutter assembly includes means for severing the ribbon of material both longitudinally and transversely, and illustratively, such means may include a first transverse roller 82 having an elongate blade extending radially outwardly therefrom for severing the material transversely, and a second transverse roller 84 having a centrally located vertically disposed blade for severing the material longitudinally. Suitable means, now shown, are provided for rotating rollers 82 and 84.

Filling machines 86 and 88, placed on independent supports, not shown, are positioned above conveyor 70 for dispensing appropriate quantities of filling material onto the individual leaves formed by the cutter assembly 80. The filling machines are essentially conventional, and by themselves, form no part of the present invention. The filling machines are preferably synchronized with the drive to the cutter assembly, and illustratively may be actuated by a cam and microswitch combination. The cut and filled leaves may then be rolled and boxed manually on work tables 90 and 92 at opposite sides of conveyor 70.

We claim:

1. Apparatus for dispensing a web of batter onto a continuously moving conveyor comprising: a reservoir; means for retaining a predetermined level of batter in said reservoir; a batter pick-up drum having an immersed portion disposed in said batter and an exposed portion disposed above said batter level; means for rotating said drum at a speed sufficient to cause a layer of batter to adhere to said drum and to travel with said drum; and means, disposed adjacent the exposed portion of said drum, for removing said layer of batter from said drum and for depositing said batter as a continuous web on said conveyor.

2. Apparatus as set forth in claim 1 wherein said batter level retaining means includes means connecting said reservoir with a source of batter, and overflow means at a predetermined level in said reservoir for returning excess batter to said supply.

3. Apparatus as set forth in claim 1 wherein said batter removal means includes a stripping blade having a first edge adjacent the periphery of said drum for stripping the layer of batter therefrom.

4. Apparatus as set forth in claim 3 wherein said stripper blade extends downwardly and away from said drum and terminates in a lower edge adjacent said conveyor.

5. Apparatus as set forth in claim 1 including means adjacent the exposed portion of said drum for controlling the width of the layer of batter carried by said drum.

6. Apparatus as set forth in claim 5 wherein said width controlling means includes a pair of spaced, laterally adjustable stripper blades, each having an edge disposed in batter stripping relationship with said drum.

7. In combination: means defining a dispensing station, a cooking station, a cutting and filling station, and a removal station; a reservoir at said dispensing station; means for maintaining a preselected level of batter in said reservoir; a first continuously moving conveyor extending from said dispensing station, through said cooking station to said cutting and filling station; means for dispensing a continuous web of batter from said reservoir onto said conveyor; heating means at said cooking station for cooking said batter while it remains on said conveyor; a second continuously moving conveyor extending from said cutting and filling station to said removal station, said second conveyor being positioned to receive the cooked web of batter from said first conveyor; means at said cutting and filling station for severing said web longitudinally and transversely to form individual leaves; and means at said cutting and filling station for dispensing filling material on each leaf.

8. The combination of claim 7 wherein said conveyors are in line with one another.

9. The combination of claim 7 wherein said first conveyor is formed of a heat resistant material.

10. The combination of claim 7 wherein said reservoir and level maintaining means are carried by a support that is movable relative to said first conveyor.

11. The method of dispensing batter in web form comprising: maintaining a predetermined level of liquid product in a reservoir; providing a rotary drum in said reservoir with a portion of the drum below the batter level and a portion of the drum above the batter level; rotating the drum at a speed sufficient to allow the drum to pick up a layer of batter by surface adhesion; stripping said layer of batter from said drum; and depositing said layer of batter as a web on a continuously moving conveyor.

12. The method of claim 11 including the step of controlling the thickness of said web by varying the speed of said drum.

13. The method of claim 11 including the step of controlling the width by adjusting laterally spaced stripper blades relative to said drum.

14. The method of claim 11 including the step of cooking the batter by moving the conveyor through an oven.

15. The method of automatically and continuously forming individual filled pastries comprising: maintaining a predetermined level of batter in a reservoir; dispensing a layer of batter of predetermined width and thickness from said reservoir onto a continuously moving conveyor; directing said conveyor through an oven to cook said batter; transferring said cooked batter to a further conveyor; severing said cooked batter transversely and longitudinally to form individual leaves; depositing filling material on each leaf; and removing said leaves from said further conveyor and rolling said leaves to complete said pastries.

16. The method of claim 15 wherein said batter dispensing step is performed by rotating a drum that is partially immersed in the batter in said reservoir so that a layer of batter adheres to the drum, and stripping said layer of batter from said drum and directing it onto said first mentioned conveyor.

17. The method of claim 15 wherein said batter dispensing step is preceded by the step of applying a nonstick coating to said drum.